Jan. 3, 1967 S. BRAUNER 3,295,763
SELF-CONTAINED TRACK GUIDED AGRICULTURAL SPRAYER
Filed Feb. 17, 1964 2 Sheets-Sheet 2

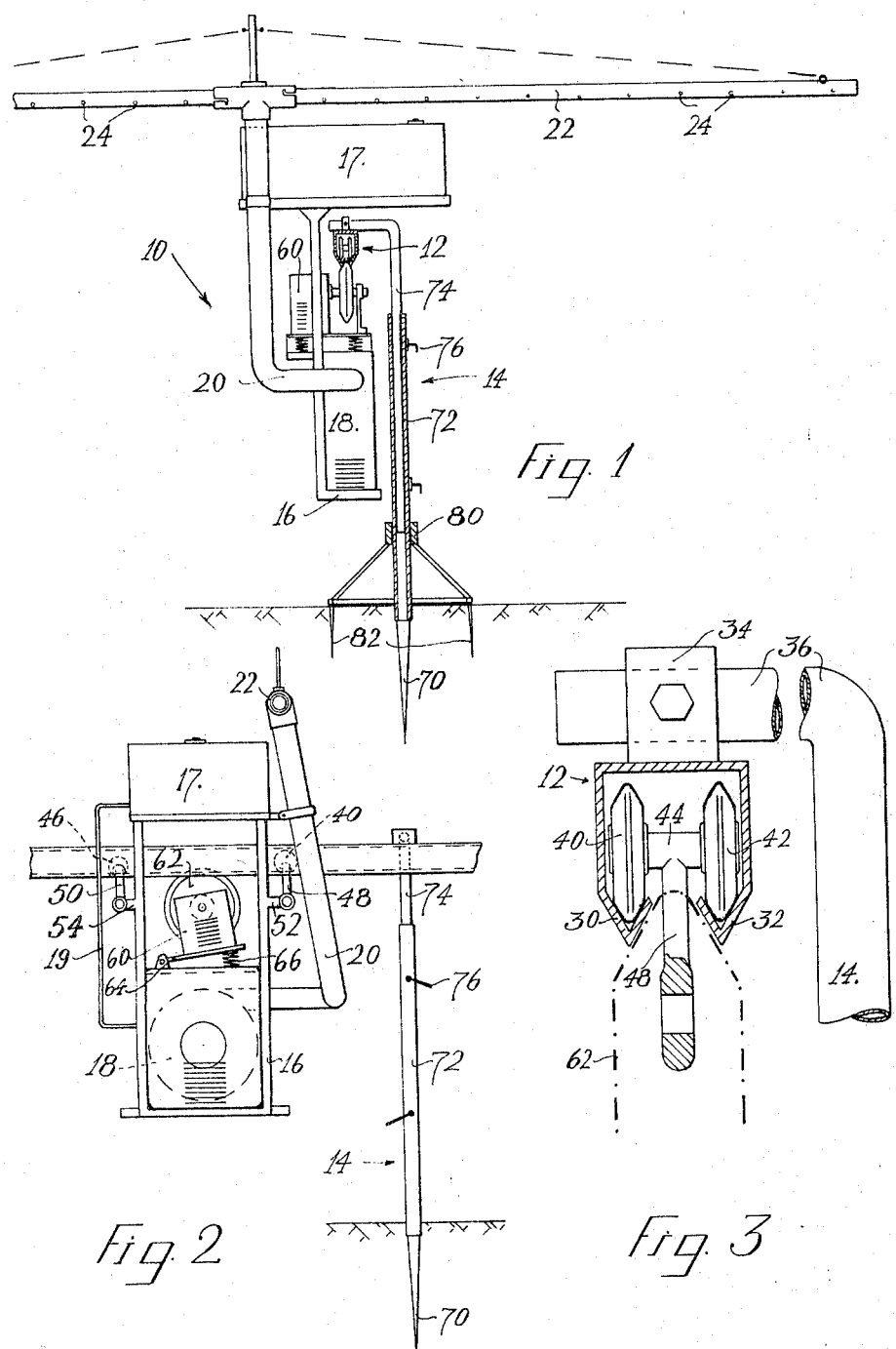

INVENTOR.
SHLOMO BRAUNER
BY

United States Patent Office 3,295,763
Patented Jan. 3, 1967

3,295,763
SELF-CONTAINED TRACK GUIDED
AGRICULTURAL SPRAYER
Shlomo Brauner, 46 Yahalom St., Ramat-Gan, Israel
Filed Feb. 17, 1964, Ser. No. 345,526
Claims priority, application Israel, Nov. 15, 1963,
20,248
5 Claims. (Cl. 239—173)

The present invention relates to spraying apparatus, and particularly to apparatus for spraying fields and the like with fluids or powder for insect and pest control.

Fields are sprayed today principally in two ways—by aircraft and manually. Among the drawbacks in aircraft spraying are the relatively large expense involved in using an aircraft for this purpose, particularly where the areas to be sprayed are relatively small, and also the difficulty in laying down the chemical spray exactly where it is desired and keeping it from where it is not desired or where it may be even harmful. In manual spraying, the operator moves relatively slowly and can cover only a very limited area before exhausting the quantity of the chemical spray he can physically carry. Also, the operator is in constant physical contact with the chemical spray, which can be very toxic. This is particularly a problem in spraying some fields of cotton where the chemical spray is toxic and the same area must be resprayed almost weekly.

An object of the present invention is to provide a novel spraying apparatus which avoids one or more of the drawbacks briefly discussed above with respect to aircraft and manual spraying.

According to a broad aspect of the invention, there is provided a new type of spraying apparatus characterized in that it is self-spraying, the sprayer unit being supported on a track extending along the area to be sprayed and including propelling means for propelling the sprayer unit along the track.

Preferably the track is in the form of a plurality of detachable sections which may be disassembled and reassembled in another area to be sprayed. The track may be supported above the ground by stakes receivable in the ground.

In the described embodiment of the invention, the propelling means includes a prime mover and a traction wheel engaging the track for propelling the sprayer unit. The sprayer unit is suspended from the track by one or more wheels engaging the upper surface of the track, and the traction wheel of the propelling means engages the lower surface of the track. The propelling means including its traction wheel is illustrated in the described embodiment as supported on a platform which is spring-urged against the underside of the track.

According to a further feature, the sprayer unit includes a pipe extending horizontally above the ground, the pipe having openings spaced along its length through which the spraying material is expressed. The pipe preferably extends substantially perpendicularly to the direction in which the sprayer unit is propelled. In one form, the pipe is supported above the track and extends on both sides of the track so as to spray both sides of the track in one pass of the spraying apparatus. Alternatively, the pipe may be supported to extend on but one side of the track so as to spray one side of the track in the forward pass of the sprayer unit and the other side in the return pass.

The accompanying drawings illustrate, diagrammatically and by way of example only, a preferred embodiment of the invention. In the drawings:

FIG. 1 is a front view, partly in section, of a sprayer apparatus constructed in accordance with the invention;

FIG. 2 is a side elevational view of the sprayer apparatus of FIG. 1;

FIG. 3 is an enlarged view, partly in section, of the means for supporting the sprayer unit from the track.

Figure 4:
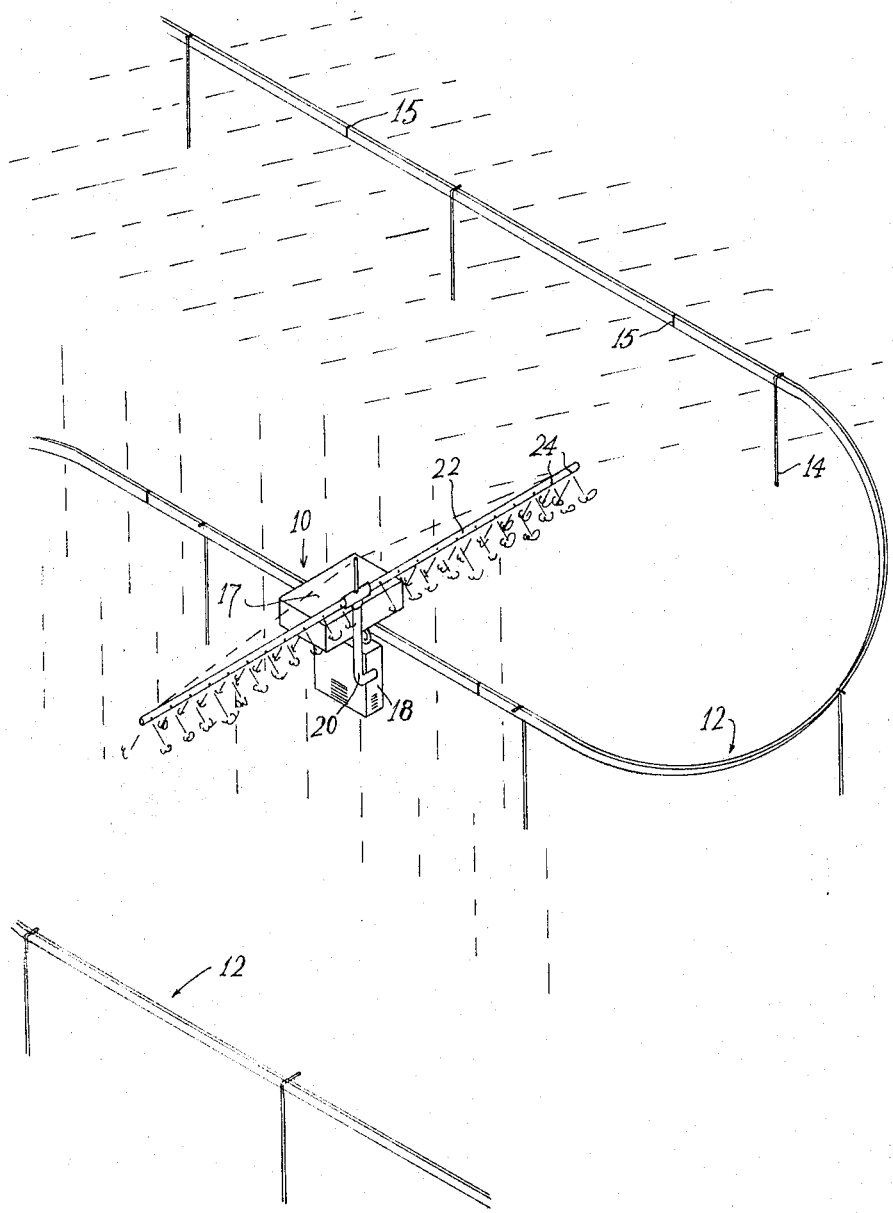
FIG. 4 is a perspective view of a field installation of the sprayer apparatus, including the sprayer unit and the track along which it is propelled.

With reference first to FIG. 4, the spraying apparatus illustrated comprises a sprayer unit 10 supported on a track 12, the track being in turn supported by stakes 14 receivable in the ground. The track 12 is made of a plurality of detachable sections as indicated by joints 15, which may be disassembled and re-assembled in the area to be sprayed. Sprayer unit 10 includes propelling means for propelling the sprayer unit along the track 12 as the sprayer unit operates to spray the area.

The sprayer unit, as best seen in FIGS. 1 and 2, includes a frame 16 which supports a tank or container 17 for containing the chemical spray material. This material passes from tank 17 through conduit 19 and is forced by a blower 18 through a conduit 20 to a pipe 22 having a plurality of openings 24 spaced along its length, through which the spraying material is expressed.

The track 12 is an inverted U-shaped channel member formed with a pair of spaced V-shaped rail sections 30 and 32. The track is supported by a hanger strap 34 from a horizontally extending arm 36 of the stake 14. The sprayer unit 10 is supported from track 12 by a plurality of wheels riding along the inside of the track channel member in engagement with the upper surfaces of rails sections 30 and 32. In the illustrated embodiment there is a front pair of wheels 40 and 42 connected by a front stub shaft 44, (FIG. 3) and similarly a rear pair of wheels generally identified by the reference numeral 46 in FIG. 2. Each of the pairs of wheels includes a depending arm 48 and 50 carried by its connecting stub shaft (e.g. 44), the depending arms being in turn coupled to arms 52 and 54 carried by the frame 16 of the sprayer unit 10.

Frame 16 also carries a prime mover 60, which may be an internal combustion engine, battery-operated electric motor, or the like. The prime mover drives a traction wheel 62 which engages the lower surfaces of the two rail sections 30 and 32. Both the prime mover 60 and its traction wheel 62 are supported on a platform 64 which is spring-urged by spring 66 against the underside of the track. Thus, the rail sections 30 and 32 will be tightly engaged between traction wheel 62 and the driven wheels 40, 42 and 46, whereby rotation of the traction wheel will propel the sprayer unit along the track 12.

The stakes 14 are formed with pointed ends 70 for penetration into the ground. Preferably, they are formed of two telescoping sections 72 and 74 which may be adjusted by rod clamps 76 to space the track 12 at any desired height above the ground. Each of the stakes 14 may include, as shown in FIG. 1 but not in FIG. 2, an auxiliary stake supporting member comprising a collar 80 clamped to the lower part of the stake and carrying a plurality of smaller stakes 82 receivable in the ground to support and steady the stake 14.

As shown particularly in FIG. 4, the pipe 22, through which the chemical spray is expressed onto the field, extends substantially perpendicularly to the direction in which the sprayer unit is propelled along track 12. The pipe 22 is supported above the track and extends on both sides of the track so as to spray both sides in one pass. Thus, the track sections 12 could be spaced about 30 meters apart, and a 30 meter pipe 22 extending about 15 meters on each side of the track will spray all the area between the track sections in one pass.

It may be desirable, however, to mount pipe 22 above the track so as to extend only on one side of the track, whereby one side of the track will be sprayed in the forward pass of the sprayer unit and the other side in the return pass. Thus, if the pipe is still 30 meters long, the track sections could be spaced about 60 meters apart.

Of course, a sprayer nozzle could be used which is considerably shorter than the span between the track sections, particularly where the spray issues laterally of the direction in which the sprayer travels.

In use, track sections 12 are disassembled and reassembled on their stakes 14 in the areas that are to be sprayed. The sprayer unit 10 is mounted at one end of the track, and propels itself along the track as it sprays the area until it reaches the opposite end, where it could be turned off by an operator waiting there, or by automatic means. When another area is to be sprayed, the track sections are assembled there, and the sprayer operated to spray that area.

By using this spraying apparatus, it is seen that the chemical spray can be laid down exactly where it is desired, and kept away from those areas where it is not desired or where it may be harmful. Also, a large supply of the chemical spray can be contained in container 17, and therefore a large area can be sprayed in one pass of the unit. If desired, extra containers of the spray material can be supported by wheels from the rail sections and towed by the sprayer unit, to further increase the area that may be sprayed in one pass. In addition, since the sprayer unit propels itself along the area to be sprayed, no human operator need come into contact with the chemical spray, and therefore possible toxic effects on humans are avoided.

For example in cotton spraying, where frequently the cotton must be sprayed almost weekly with different concentration of chemical spray, the apparatus described may be particularly used with advantage. The track can be left in place for an extended time and the same area resprayed many times, and when it is desired to use the track for spraying a different area, it can be conveniently disassembled and reassembled at the different area.

While, as indicated earlier, it is usually preferable to have the track in the form of a plurality of detachable sections, it may be desirable in some applications, for example for spraying from above the tops of trees (e.g. citrus groves), to have the track in the form of a cable or the like strung from trees, poles or other supports.

It is to be understood that the described embodiment of the invention is illustrative only, and that many other embodiments, variations, and applications of the invention, or the several features thereof disclosed, may be made without departing from the spirit and scope of the invention as defined in the following claims:

I claim:
1. Spraying apparatus comprising a sprayer unit, said sprayer unit including a container for containing the material to be sprayed, a track, means for supporting the track above the ground in the area to be sprayed, a traction wheel carried by said sprayer unit and engageable with one side of the track for propelling the sprayer unit including its spraying material container, a driven wheel carried by said sprayer unit and engageable with the other side of said track, and a prime mover carried by said sprayer unit for driving said traction wheel.

2. Spraying apparatus as defined in claim 1, wherein said sprayer unit includes a front driven wheel and a rear driven wheel, each engageable with the upper side of said track, said traction wheel being disposed between said driven wheels and engageable with the lower side of said track.

3. Spraying apparatus as defined in claim 2, wherein said track is in the form of an inverted U-shape channel member formed with a pair of spaced V-shaped rail sections, said sprayer unit including a front pair of driven wheels engaging said spaced V-shaped sections and a rear pair of driven wheels engaging said V-shaped sections.

4. Spraying apparatus comprising a sprayer unit, a track, means for supporting the track above the ground in the area to be sprayed, a platform carried by said sprayer unit below said track, a traction wheel supported on said platform, spring means urging said platform to bring said traction wheel against the lower surface of said track, at least one driven wheel supported by said sprayer unit and engaging the upper surface of said track, and a prime mover for driving said traction wheel.

5. Spraying apparatus as defined in claim 4, wherein said prime mover is also supported on said platform.

References Cited by the Examiner

UNITED STATES PATENTS

| | | | |
|---|---|---|---|
| 832,973 | 10/1906 | Harwood | 239—173 X |
| 849,505 | 4/1907 | Schroedter | 239—192 |
| 3,129,671 | 4/1964 | Vanderbeck | 105—153 |

FOREIGN PATENTS

| | | |
|---|---|---|
| 162,262 | 2/1949 | Austria. |
| 1,152,716 | 9/1957 | France. |
| 1,260,745 | 4/1961 | France. |
| 837,938 | 5/1952 | Germany. |
| 3,121 A.D. | 1905 | Great Britain. |

M. HENSON WOOD, JR., *Primary Examiner.*

EVERETT W. KIRBY, *Examiner.*

D. L. MOSELEY, V. C. WILKS, *Assistant Examiners.*